United States Patent Office 3,197,870
Patented Aug. 3, 1965

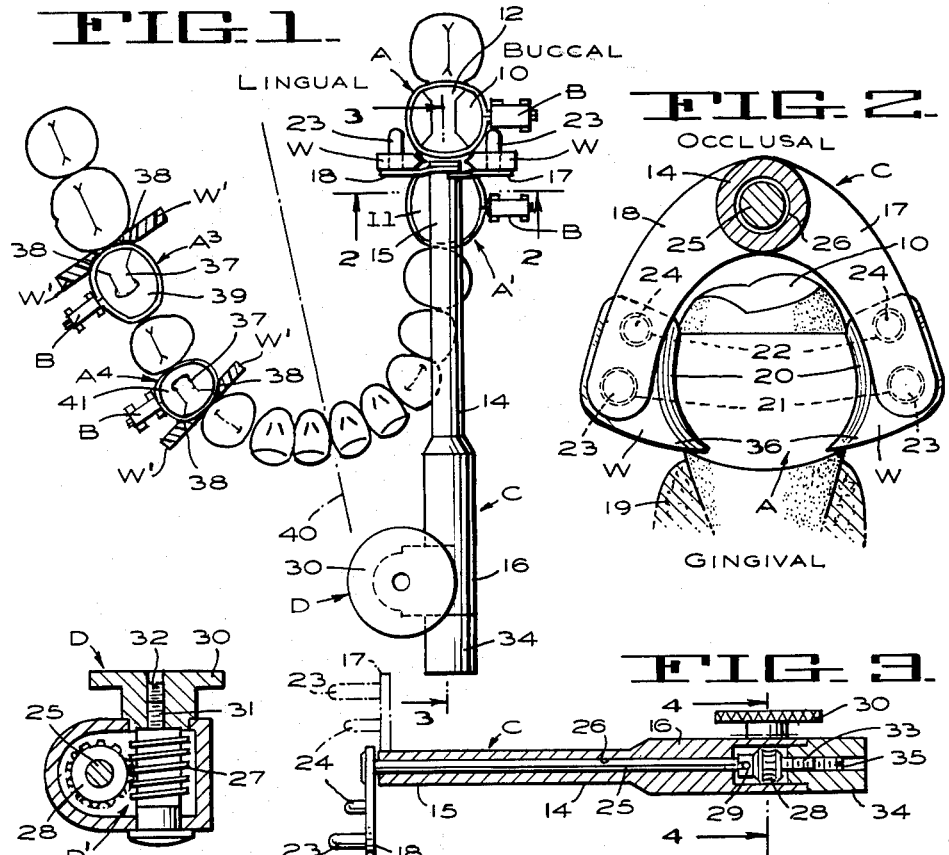
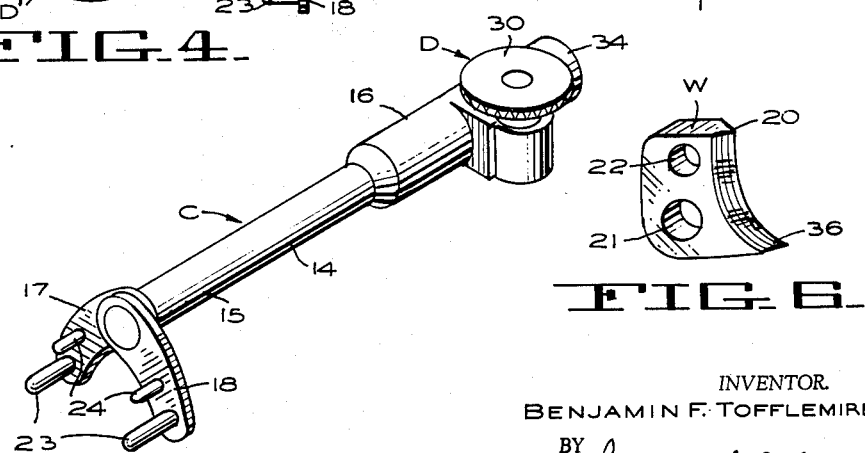

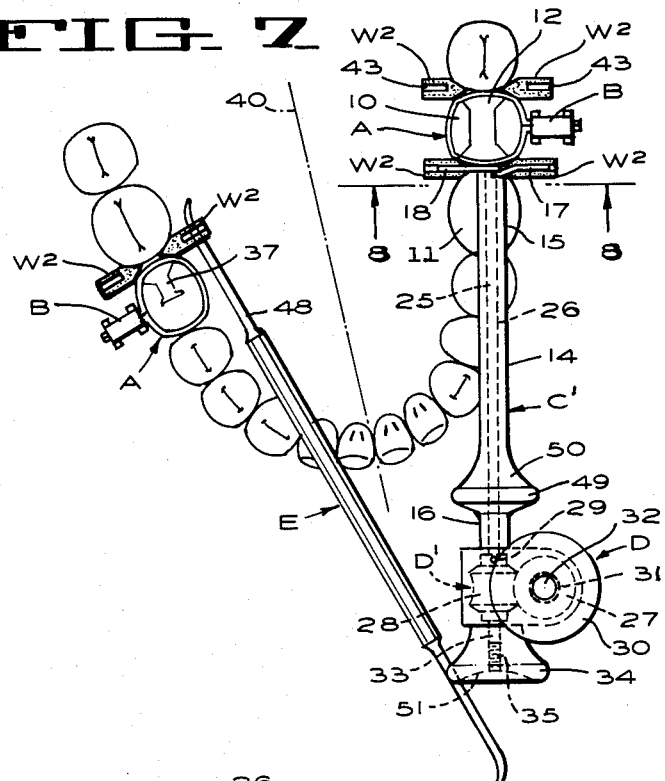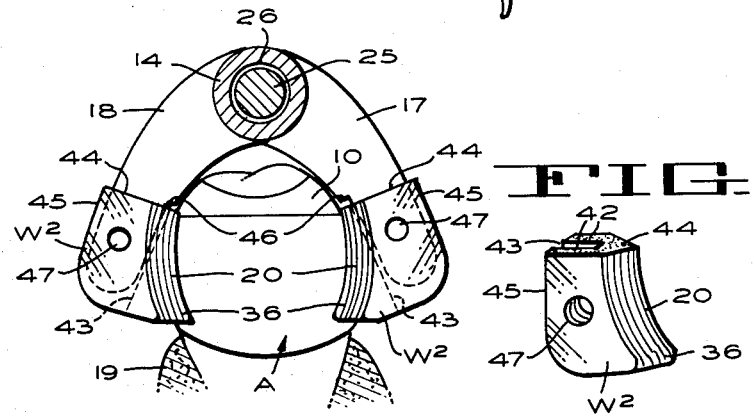

3,197,870
DENTAL SEPARATOR
Benjamin F. Tofflemire, Lafayette, Calif.
Filed Jan. 31, 1963, Ser. No. 256,194
9 Claims. (Cl. 32—64)

This application is a continuation-in-part of my copending application on a "Dental Separator," Serial No. 225,325, which was filed in the United States Patent Office on September 21, 1962 (now abandoned).

The present invention relates to improvements in a dental separator intended for use in restorative dentistry so as to secure adequate inter-dental separation prior to a filling operation.

It is proposed in this invention to provide an improved dental separator that will exert the proper, uniform, gentle and controlled action of separating adjacent teeth. This is in contra-distinction to the one-sided, unilateral, poliodontic-torque exerted on the teeth, when conventional wooden or plastic wedges are used and inserted from the buccal or lingual aspect of the involved teeth, since such wedges do not have the necessary anatomical shape and do not provide for proper support of the teeth.

Another object of the invention is to provide an improved dental separator that permits the bilateral placement of wedges on opposing lateral aspects of the involved teeth, the spreading of the teeth being uniformly accomplished without marked discomfort to the patient. At the same time, both the buccal and lingual areas of the involved teeth are fully supported by my improved wedges.

Moreover, the one-sided wedge has always been forced into the inter-dental area by vigorous pressure or mallet force, usually limited only by the tolerance of the patient in those cases without anesthetic, or by the conscience of the operator in the cases providing an obtunding nerve-block. My bilaterally contoured wedges, on the other hand, are placed in position, and are very gradually and uniformly seated in the inter-dental area by my separator, permitting the operator to standardize and uniformly control the amount and degree of each and every restoration.

A still further object of the invention is to provide a dental separator that may be utilized for inserting the wedges into a selected inter-dental area or areas, and then the dental separator may be withdrawn from the patient's mouth so as to leave an unobstructed field of view. Subsequently, the same dental separator or instrument may be employed for removing the wedges, all with facility and ease.

It is further proposed in this invention to provide a dental separator having a pair of arms that are adapted to extend gingivally in straddling relation with the patient's teeth, these arms being movable toward and away from one another, and each arm carrying a removable wedge. When the dental separator is used on multiple banding operations, and a series of bilaterally-placed wedges tend to fence in the banded tooth, the arms of the dental separator may be removed from the wedges in occlusal and lateral directions, without interference by other wedges that may have been moved into place during the multiple banding operation.

Other objects and advantages will appear as the specification proceeds, and the novel features of the invention will be set forth in the appended claims.

Drawings

For a better understanding of the invention, reference should be had to the accompanying drawings, forming part of this specification, in which:

FIGURE 1 is an occlusal view of the lower right and left quadrants of a patient's teeth, and showing my dental separator in a position to apply a pair of wedges to the buccal and lingual aspects of two involved teeth, with the wedges being inserted into a selected inter-dental area;

FIGURE 2 is an enlarged bucco-lingual view taken along the plane 2—2 of FIGURE 1;

FIGURE 3 is a longitudinal sectional view taken along the plane 3—3 of FIGURE 1;

FIGURE 4 is a transverse sectional view taken along the plane 4—4 of FIGURE 3 on an enlarged scale;

FIGURE 5 is an isometric view of the instrument part of my dental separator;

FIGURE 6 is an isometric view of one of my improved wedges;

FIGURE 7 is an occlusal view showing a modified form of my dental separator;

FIGURE 8 is an enlarged bucco-lingual view taken along the plane 8—8 of FIGURE 7; and FIGURE 9 is an isometric view of a slotted wedge that is used in connection with the modified dental separator.

While I have shown only the preferred forms of my invention, it should be understood that various changes, or modifications, may be made within the scope of the annexed claims without departing from the spirit thereof.

Detailed description

Referring now to the drawings in detail, I have shown the lower right and left quadrants of a patient's teeth in FIGURE 1. It will be noted that a dental matrix band A has been applied around the lower right second molar 10, while a second dental matrix band A' has been applied around the lower right first molar 11. These teeth, of course, are disposed in adjacent relation with one another, and both may be fashioned with prepared cavities 12 therein. Both of these dental matrix bands may be placed and then secured by retaining clamps B of the type disclosed in my United States Letters Patent No. 3,046,659, granted July 31, 1962.

As clearly illustrated in FIGURES 1, 2, 3 and 5, I provide a dental separator designated generally at C, in which a single elongated instrument handle 14 defines a forward end 15 made for insertion into a patient's mouth occlusally relative to a quadrant of teeth, and this handle has sufficient length so that its rear end 16 will project outwardly from the mouth, as shown in FIGURE 1.

A pair of arms 17 and 18 are disposed at the forward end 15 of the handle 14 for movement toward and away from one another in planes extending substantially at right angles to the longitudinal axis of the handle 14, these arms being adapted to extend gingivally (toward the gums 19) in straddling relation with the patient's teeth, with the arms 17 and 18 being arranged on the buccal and lingual aspects of the teeth, respectively. The buccal aspect faces toward the patient's cheek, while the lingual aspect faces toward the tongue of the patient, appropriate legends "Buccal" and "Lingual" having been added to the drawing for ready identification.

In FIGURES 1 and 2, I have disclosed a teeth-spreading wedge W of the bilateral type as being anchored to each of the arms 17 and 18, with each wedge being fashioned with a bilateral bevelled inner edge 20 facing toward the teeth and adapted to register with the selected inter-dental area between the adjacent teeth 10 and 11.

For the purpose of removably anchoring the wedges W to the arms 17 and 18, each wedge is fashioned with a gingival hole 21 and an occlusal hole 22, these holes being spaced one above the other as shown in FIGURES 2 and 6. Moreover, each of these arms is provided with gingival and occlusal pins 23 and 24, respectively, that are spaced one above the other and which may be inserted through the holes 21 and 22, respectively. It will be observed that the pins 23 are longer and larger in diameter than the pins 24 so that the pins must be inserted through their respective holes, that is, the pins 23 must be moved into the holes 21 and the pins 24 into the holes 22. Other advantages of this arrangement will be pointed out as the specification continues.

In FIGURES 1, 4 and 5, I show operating means D operable from the projecting rear end 16 of the handle 14 for moving the arms 17 and 18 toward and away from one another. When these arms are moved toward each other, the wedges W will be moved into the selected interdental area to spread adjacent teeth apart.

It will be observed from FIGURES 1 and 3 that the arm 17 is rigidly attached to the forward end 15 of the handle 14, while the arm 18 is fixed to and turned by a rod 25 extending lengthwise through a bore 26 of the handle to the operating means D. The operating means includes a drive mechanism D' (see FIGURE 4) that is self-locking, when not being actuated, whereby the arms 17 and 18 and the wedges W will remain in the positions to which they have been adjusted until the operating means D is actuated again.

In its structural details, the operating means D includes a worm 27 meshing with a worm gear 28, the latter being fixed to the rod 25 by a pin 29 or the like (see FIGURE 3). An operating knob 30 is secured to the worm 27 for turning the latter, the axis of rotation of the worm extending substantially at right angles to the occlusal plane of the patient's teeth. When the dental separator is applied to the lower quadrants of teeth, as in FIGURE 1, the knob 30 is presented upwardly above the handle 14, while the knob 30 wil be arranged underneath the handle 14 when the handle is turned upside down and the dental separator is applied to the upper quadrants of the patient's teeth. The axis of rotation of the knob 30 and worm 27 is disposed at substanially right angles with respect to the longitudinal axis of the handle 14 (see FIGURE 3).

For the purpose of removably securing the operating knob 30 to the worm 27, the latter has a stub shaft 31 that is threaded into the knob, and then a set screw 32 carried by the knob may be tightened so as to prevent the knob 30 from turning relative to the stub shaft 31 (see FIGURE 4).

In FIGURE 3, I show the rod 25 as having a threaded rear end portion 33 that may be screwed into a bearing member 34, and a set screw 35 is threaded into the member 34 to abut the rear end portion 33 of the rod 25, thus fixing the bearing member to the rod. The bearing member projects into the rear end 16 of the handle 14 so as to support the rear portion 33 for freedom of turning movement relative to the instrument handle.

With particular reference to FIGURES 2 and 6, it will be seen that each wedge W is made concaved in an occluso-gingival direction, with each wedge having a projecting prong 36 at its gingival-facing end.

It will be noted that the gingival pins 23 and the occlusal pins 24 are all arranged in parallel relation with one another and project forwardly from their respective arms 17 and 18 in substantially parallel relation with the longitudinal axis of the handle 14. Thus the pins 23 and 24 may be withdrawn from the holes 21 and 22, respectively, of the wedges W, leaving the latter in place between the teeth 10 and 11, when the handle 14 is withdrawn from the patient's mouth.

Inasmuch as the gingival pins 23 are longer than the occlusal pins 24, the gingival pins may be reinserted into the gingival holes 21 of the wedges W, and the operating means D reversed and actuated to withdraw the wedges from between the teeth, without the necessaity of lining up the occlusal pins 24 with the occlusal holes 22. This is an important structural feature. Since the gingival pins are larger in diameter than the occlusal pins, the gingival pins 23 may be inserted only into the gingival holes 21, whereby the wedges will be withdrawn first from the gingival aspect of the teeth, when the operating means D is reversed.

The wedges are preformed, anatomically contoured, and bilaterally opposed, and may be formed from any suitable material, such as nylon, Teflon, or aluminum, or even wood. They may be moulded or extruded.

In FIGURE 1, I have shown modified wedges W' which are made right and left unilateral. These wedges, of course, will follow the general outline shown in FIGURE 2 and will be provided with gingival and occlusal holes extending therethrough, and thus the modified wedges may be readily placed on the orienting pins 23 and 24.

The wedges are completely interchangeable, permitting the use of two bilaterally contoured wedges W, opposing each other, on either the right side of the mouth or on the left side thereof, and on either the lower or upper arch. Similarly, two unilateral wedges W' may be used on those cases involving only one Class II preparation or cavity 37, and necessitate only that the operator use one "right" and one "left" wedge opposing each other in such a manner that the curved bevels 38 face the prepared tooth.

In FIGURE 1, I have disclosed a dental matrix band $A^3$ as encircling the lower left first molar 39, with a pair of the bilateral wedges W' being disposed on the distal aspect of this tooth, that is, away from the medial plane. Likewise, a dental matrix band $A^4$ has been applied to the lower left first bicuspid 41, with a pair of the bilateral wedges W' being arranged on the mesial aspect of the bicuspid, that is toward the medial plane 40.

As previously mentioned, the "right" and "left" wedges W' are readily interchangeable, and the only requirement is that the operator place the opposing unilateral wedges with the curved or bevelled side 38 facing the prepared cavity 37 upon which an encircling dental matrix band has been placed. Needless to say, the bilateral wedges W may be used in any position. The bevelled side of the wedge must, of course, face inwardly, so that the bevelled edges of the pair of wedges will extend toward one another.

I desire to emphasize the fact that the action of spreading adjacent teeth apart is so gently and uniformly accomplished that appreciable discomfort to the patient is eliminated, and at the same time both the buccal and lingual areas of the adjacent teeth are supported by the wedges.

The operating knob 30 may be positioned on either side of the handle 14, depending upon whether the operator is right-handed or left-handed. It is preferable that this knob be turned in a clockwise direction, when moving the arms 17 and 18 toward one another to spread adjacent teeth apart.

After securing the necessary degree of separation, the dental separator is readily removed from the opposing wedges W or W' by reversing the knurled knob 30 a mere fraction of a turn (less than one-tenth of a turn relieves the stress, or tension, of insertion) and permits the removal of the handle 14 in a withdrawal plane which is directly forward or towards the operator.

The frictional drag on the wedges maintain the position of the wedges during the filling operation. Then the wedges may be removed after the packing of the alloy by inserting the gingival pins in the holes 21 and reversing the turning movement of the knob 30.

When applied to the lower teeth, the operating knob 30 is directed upwardly; when applied to the upper arch, this knob is directed downwardly or toward the chin. These positions are maintained for either the right or left side of the patient's mouth, and are equally applicable to both right-handed and left-handed operators.

Where multiple banding operations are being carried out, and a series of bilaterally-placed wedges W tend to fence in the banded tooth and the retaining clamps B, as shown in FIGURE 1, difficulty may result in attempting to withdraw the pins 23 and 24 from the holes 21 and 22, respectively. However, the dental separator C may be utilized and this difficulty overcome by removing the wedges that are closer to the median plane 40 and then proceeding toward the rearmost teeth during removal of the wedges. Likewise, in order to avoid interference by the pins, the bands and wedges may be first applied to the rearmost teeth and then the operator may proceed toward the median plane 40, during the multiple banding operation.

In order to overcome this difficulty for some operators, I have provided a modified form of a dental separator C', which is the subject matter of the continuation-in-part of this application, and illustrated in FIGURES 7, 8 and 9 of the drawings. The dental separator C' is quite similar to the dental separator C previously described and like reference numerals have been applied to corresponding parts.

It will be observed that the pins 23 and 24 are omitted from the arms 17 and 18 in FIGURES 7 and 8, and a slotted teeth-spreading wedge W² is removably anchored to each of these arms by the latter frictionally engaging with walls 42 of a slot 43 fashioned in each wedge W². The slot 43 of each wedge extends into the latter from both the occlusal aspect 44 and the lateral side 45 of the wedge remote from its bevelled edge 20. Thus the arms 17 and 18 may be disengaged from the wedges W² in occlusal and lateral directions. This arrangement has a decided advantage for multiple banding operations.

Adequate orientation of the wedges W² and effective retention of these wedges on the arms 17 and 18 while in use are provided by right-angle stops 46 fashioned on the inner curved edges of these arms (see FIGURE 8). The walls 42 of the slots 43 have a snug fit with the inserted arms 17 and 18, and the inherent spring-like resiliency of the plastic or other suitable material of the wedges will exert a frictional grip on the arms during the placing of the wedges. When the arms 17 and 18 are moved toward one another, these wedges will frictionally grip the matrix bands and adjacent parts of the teeth, retaining the wedges in place.

The dental separator C' may now be removed by reversing the turning movement of the knob 30, and the arms 17 and 18 withdrawn from the slots 43 of the wedges W² either vertically (occlusally) or laterally, or by a combination of these movements. This will leave an unobscured view of the operative field and permit the use of multiple similarly-placed opposing wedges W².

Each wedge W² is fashioned with a hole 47 extending substantially parallel with the longitudinal axis of the handle 14 and into which a removing tool E may be inserted to withdraw the wedge from the inter-dental area after the tooth has been restored. The holes 47 extend in a mesio-distal direction relative to the patient's teeth to thus facilitate insertion of the removing tool E into the holes of the wedges. The frictional grip of the rounded post 48 of the removing tool E holds the wedge W² on the tool during removal of the wedge from the patient's mouth and the wedge intentionally pulled off the rounded post.

This instrument handle 14 of the dental separator C' is provided with an annulus 49 having a forward face 50 against which fingers of an operator may be engaged, with the fingers straddling the handle. Moreover, a concavity 51 is formed in the rear end of the handle and into which the thumb of the operator's same hand may be engaged, whereby the dental separator C' may be firmly supported in one hand of the operator.

As shown in FIGURE 1, the operating means D has its knob 30 positioned between the annulus 49 and the concavity 51 and exposed for being freely engaged for turning movements by the other hand of the operator.

It will be noted from FIGURES 1 and 5 that a conical portion is provided on the instrument handle between the forward end 15 and the rear end 16, which may be engaged by fingers of the operator in the same manner as the annulus 49, and that the thumb of the operator's same hand may engage with the rear end of the bearing member 34. Thus the dental separator C may be firmly held in one hand of the operator, while the knob 30 is actuated by the other hand of the operator.

I claim:

1. In a dental separator:
   (a) a single elongated instrument handle defining a forward end;
   (b) a pair of arms disposed at the forward end of the handle and mounted for swinging movement toward and away from one another in planes extending substantially at right angles relative to the longitudinal axis of the handle;
   (c) a teeth-spreading wedge removably anchored to each of the arms, with each wedge being fashioned with a bevelled inner edge;
   (d) and operating means operable from a rear end of the handle for moving the arms toward and away from one another to move the wedges therewith;
   (e) the operating means including a worm meshing with a worm gear, and an operating knob secured to the worm for turning the latter, the axis of rotation of the worm extending substantially at right angles relative to the longitudinal axis of the handle,
   (f) the wedges having concavely shaped inner surfaces which face one another and being substantially rigid.

2. In a dental separator:
   (a) a single elongated instrument handle defining a forward end;
   (b) a pair of arms disposed at the forward end of the handle and mounted for swinging movement toward and away from one another in planes extending substantially at right angles relative to the longitudinal axis of the handle;
   (c) each arm being provided with a pair of pins spaced one above the other, with the pins paralleling one another and projecting forwardly from their respective arms in substantially parallel relation with the longitudinal axis of the handle;
   (d) a teeth-spreading wedge provided for each arm, and each wedge being fashioned with a pair of holes spaced one above the other into which selected pins on the arms may be inserted, whereby the wedges will be removably anchored to their respective arms;
   (e) each wedge being fashioned with a bevelled inner edge;
   (f) and operating means operable from a rear end of the handle for moving the arms toward and away from one another to move the wedges therewith.

3. The dental separator, as set forth in claim 2;
   (g) and in which the holes in each wedge are different in diameters and one pin on each arm is longer than the other pin on the same arm, whereby the longer pins may be reinserted into selected holes in the wedges, and the operating means reversed and actuated to separate the wedges relative to one another, without the necessity of lining up the shorter pins with the other holes of the wedges.

4. The dental separator, as set forth in claim 3;
   (h) and in which the longer pins are larger in diameter than the shorter pins, and the longer and larger pins may be inserted only into the larger diameter holes of the wedges.

5. In a dental separator:
   (a) a single elongated handle defining a forward end;
   (b) a pair of arms disposed at the forward end of the handle and mounted for swinging movement toward and away from one another in planes extending substantially at right angles relative to the longitudinal axis of the handle;
   (c) a teeth-spreading wedge removably anchored to each of the arms, with each wedge being fashioned with a bevelled inner edge;

(d) one of the arms being rigidly attached to the forward end of the handle to extend laterally therefrom, and the other arm being fixed to and turned by a rod extending lengthwise through the handle, with the latter arm extending laterally from the rod;

(e) and operating means secured to the rod and being operable from a rear end of the handle for moving one of the arms toward and away from the other arm to move the wedges therewith.

6. In a dental separator:
(a) a single elongated instrument handle defining a forward end;
(b) a pair of arms disposed at the forward end of the handle and mounted for swinging movement toward and away from one another in planes extending substantially at right angles relative to the longitudinal axis of the handle;
(c) a teeth-spreading wedge removably anchored to each of the arms by a frictional slotted-wall arrangement, and each wedge being fashioned with a bevelled inner edge;
(d) operating means operable from a rear end of the handle for moving the arms toward and away from one another to move the wedges therewith;
(e) the frictional slotted-wall arrangement for each wedge extending both vertically and laterally relative to the wedge, whereby the arms may be disengaged from the wedges in vertical and lateral directions;
(f) the wedges having concavely shaped inner surfaces which face one another and being substantially rigid.

7. The dental separator, as set forth in claim 6;
(g) and in which each wedge is fashioned with a hole extending substantially parallel with the longitudinal axis of the handle and into which a removing tool may be inserted to withdraw the disengaged wedge.

8. In a dental separator:
(a) a single elongated instrument handle defining a forward end;
(b) a pair of arms disposed at the forward end of the handle and mounted for swinging movement toward and away from one another in planes extending substantially at right angles relative to the longitudinal axis of the handle;
(c) a teeth-spreading wedge removably anchored to each of the arms, with each wedge being fashioned with a bevelled inner edge;
(d) operating means operable from a rear end of the handle for moving the arms toward and away from one another to move the wedges therewith;
(e) and the handle being provided with an annulus having a forward face against which fingers of an operator may be engaged, with the fingers straddling the handle, and the handle having a rear end against which the thumb of the operator's same hand may be engaged, whereby the dental separator may be firmly supported in one hand of the operator;
(f) the wedges having concavely shaped inner surfaces which face one another and being substantially rigid.

9. The dental separtor, as set forth in claim 8;
(g) and in which the operating means has a knob positioned between the annulus and the rear end of the handle, the knob being exposed for being turned by the other hand of the operator.

References Cited by the Examiner

UNITED STATES PATENTS

| | | | |
|---|---|---|---|
| 368,988 | 8/87 | Williams | 32—64 |
| 1,669,231 | 5/28 | Curran | 32—63 |
| 2,043,999 | 6/36 | Harper | 32—63 |
| 2,629,930 | 3/53 | Lane | 32—63 |
| 2,912,976 | 11/59 | Grund | 128—62 |
| 2,917,759 | 12/59 | Siampus | 128—62 X |

FOREIGN PATENTS 100,647   4/37   Australia.

RICHARD A. GAUDET, *Primary Examiner.*
ROBERT E. MORGAN, *Examiner.*